Dec. 23, 1952  B. R. CARSON  2,622,884
PHONOGRAPH
Filed Aug. 28, 1942  13 Sheets-Sheet 1

Inventor
Benjamin R. Carson
By
C. D. Tuska
Attorney

Dec. 23, 1952     B. R. CARSON     2,622,884
PHONOGRAPH

Filed Aug. 28, 1942     13 Sheets-Sheet 3

Inventor
*Benjamin R. Carson*
By *C. D. Tuska*
Attorney

Dec. 23, 1952  B. R. CARSON  2,622,884
PHONOGRAPH
Filed Aug. 28, 1942  13 Sheets-Sheet 4

Inventor
Benjamin R. Carson
By
[signature]
Attorney

Dec. 23, 1952     B. R. CARSON     2,622,884
PHONOGRAPH

Filed Aug. 28, 1942     13 Sheets-Sheet 5

Inventor
Benjamin R. Carson
By C.D. Tuska
Attorney

Dec. 23, 1952   B. R. CARSON   2,622,884
PHONOGRAPH
Filed Aug. 28, 1942   13 Sheets-Sheet 6
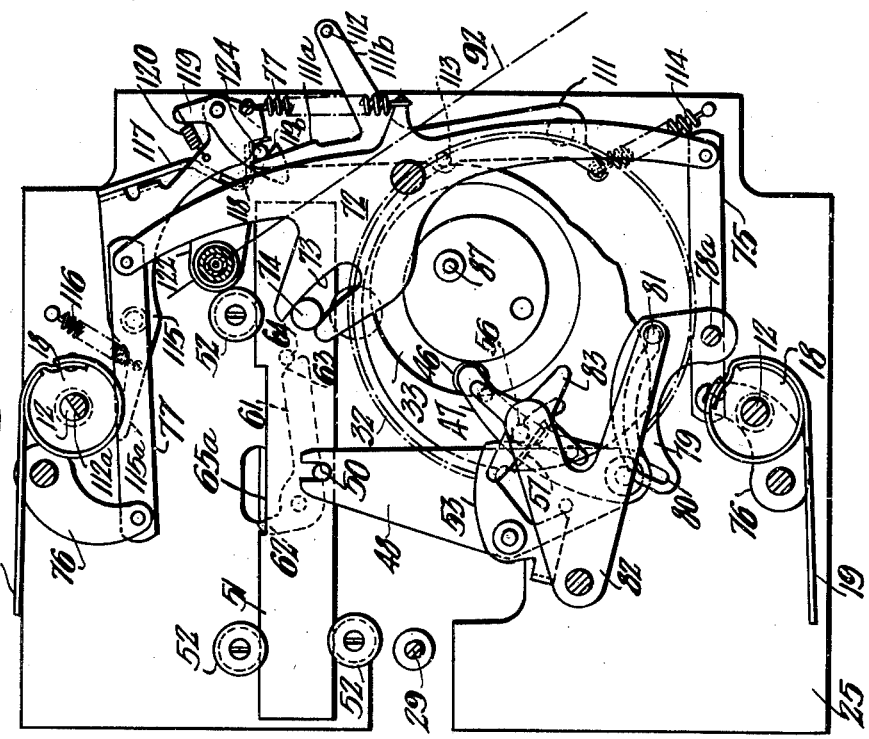
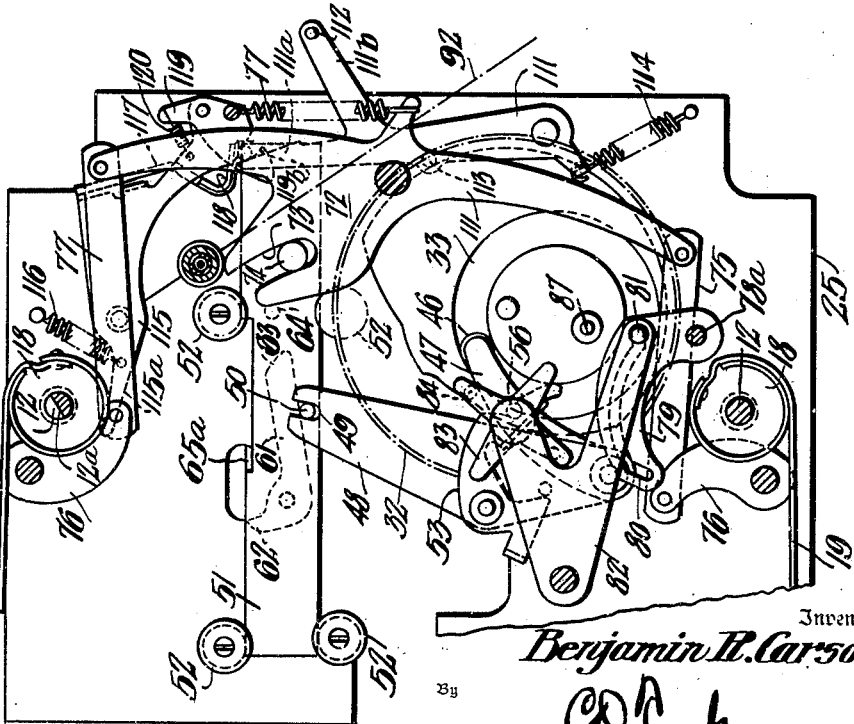
Inventor
Benjamin R. Carson
By
C D Tuska
Attorney Dec. 23, 1952     B. R. CARSON     2,622,884
PHONOGRAPH
Filed Aug. 28, 1942     13 Sheets-Sheet 7
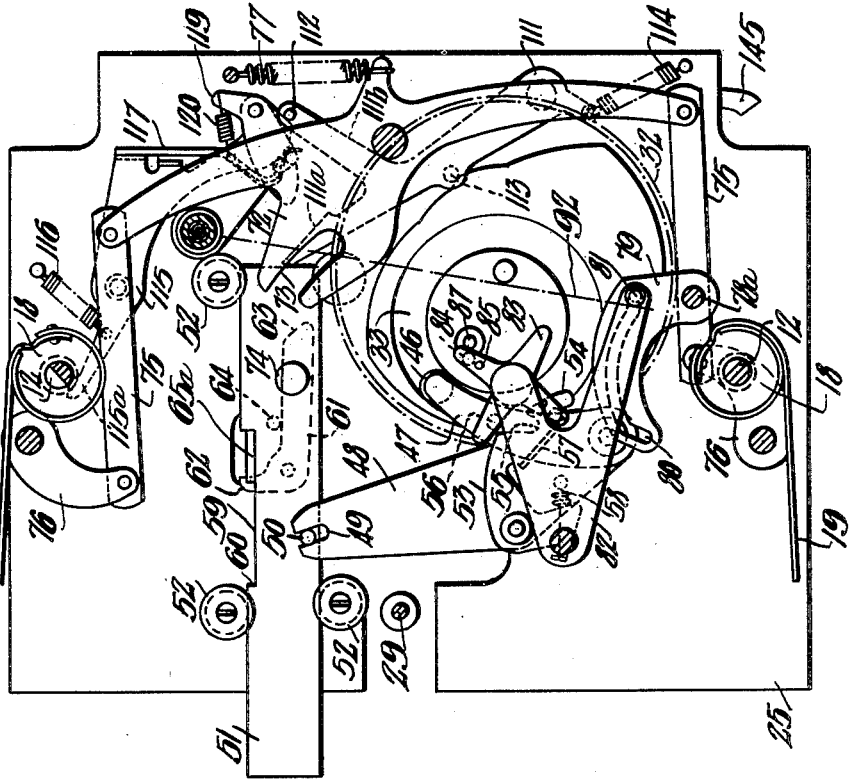
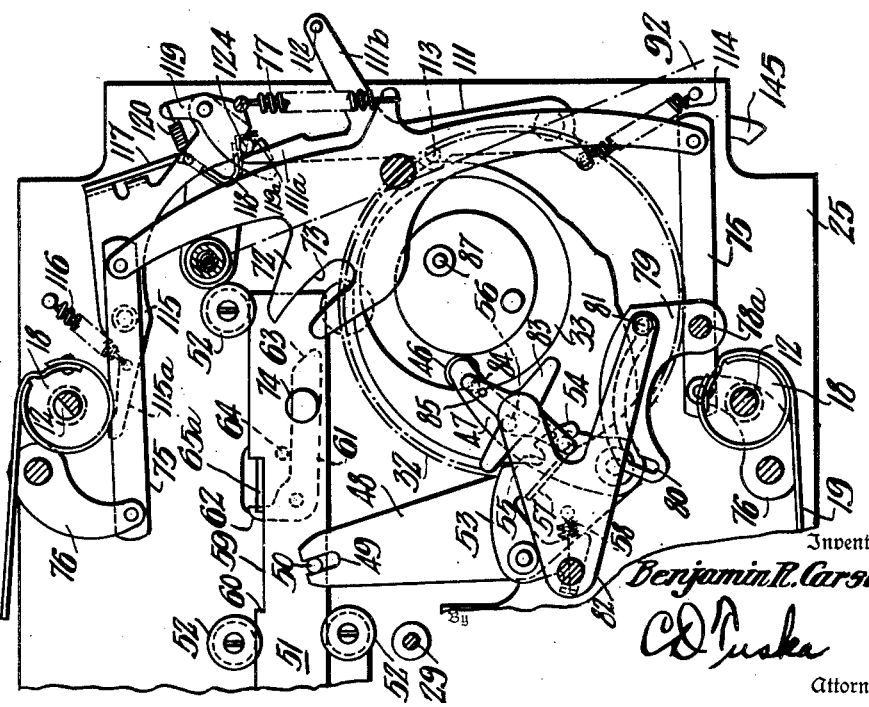
Inventor
*Benjamin R. Carson*
By *C. D. Tuska*
Attorney

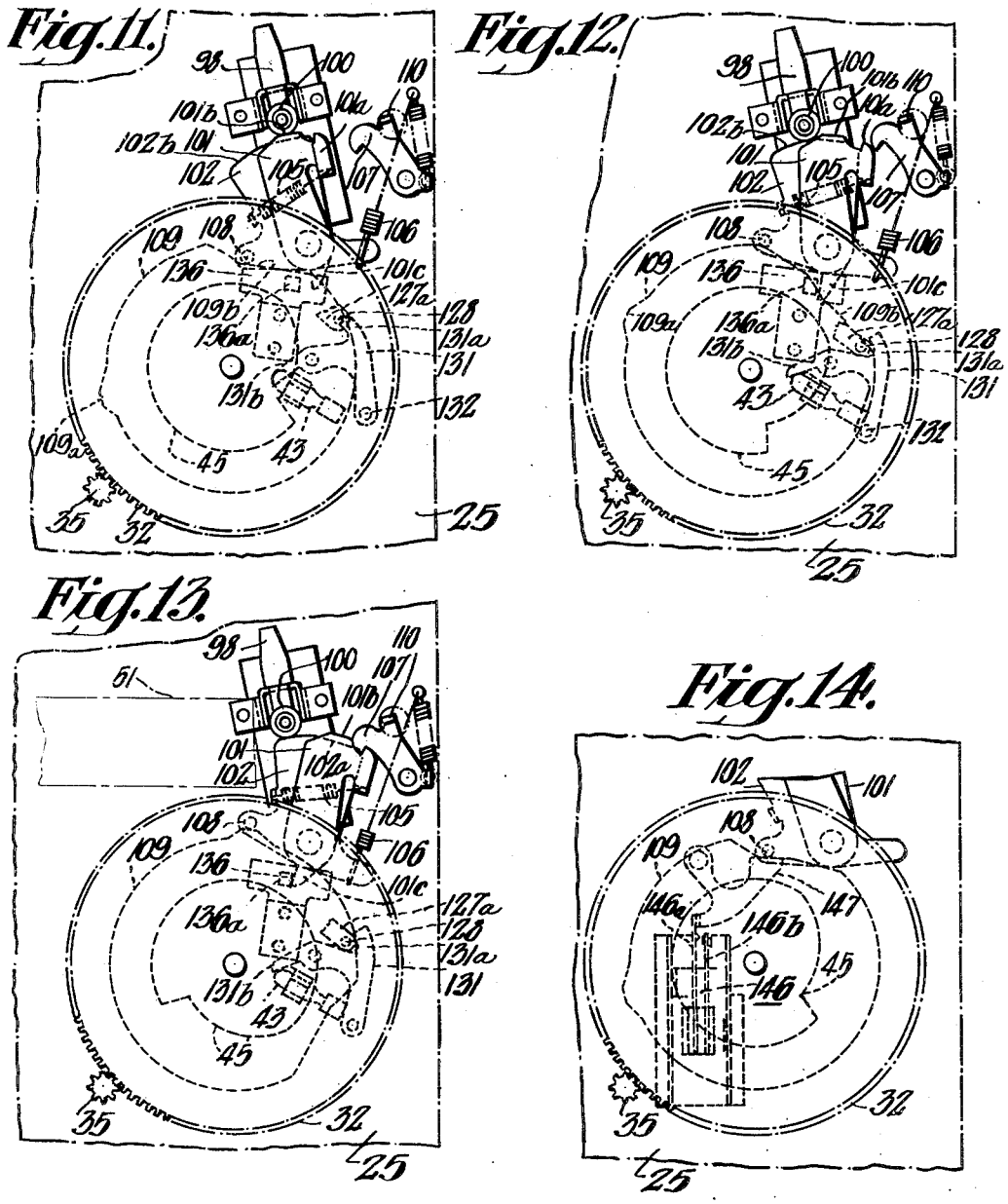

Dec. 23, 1952     B. R. CARSON     2,622,884
PHONOGRAPH

Filed Aug. 28, 1942     13 Sheets-Sheet 9

Inventor
Benjamin R. Carson
By
C&Tuska
Attorney

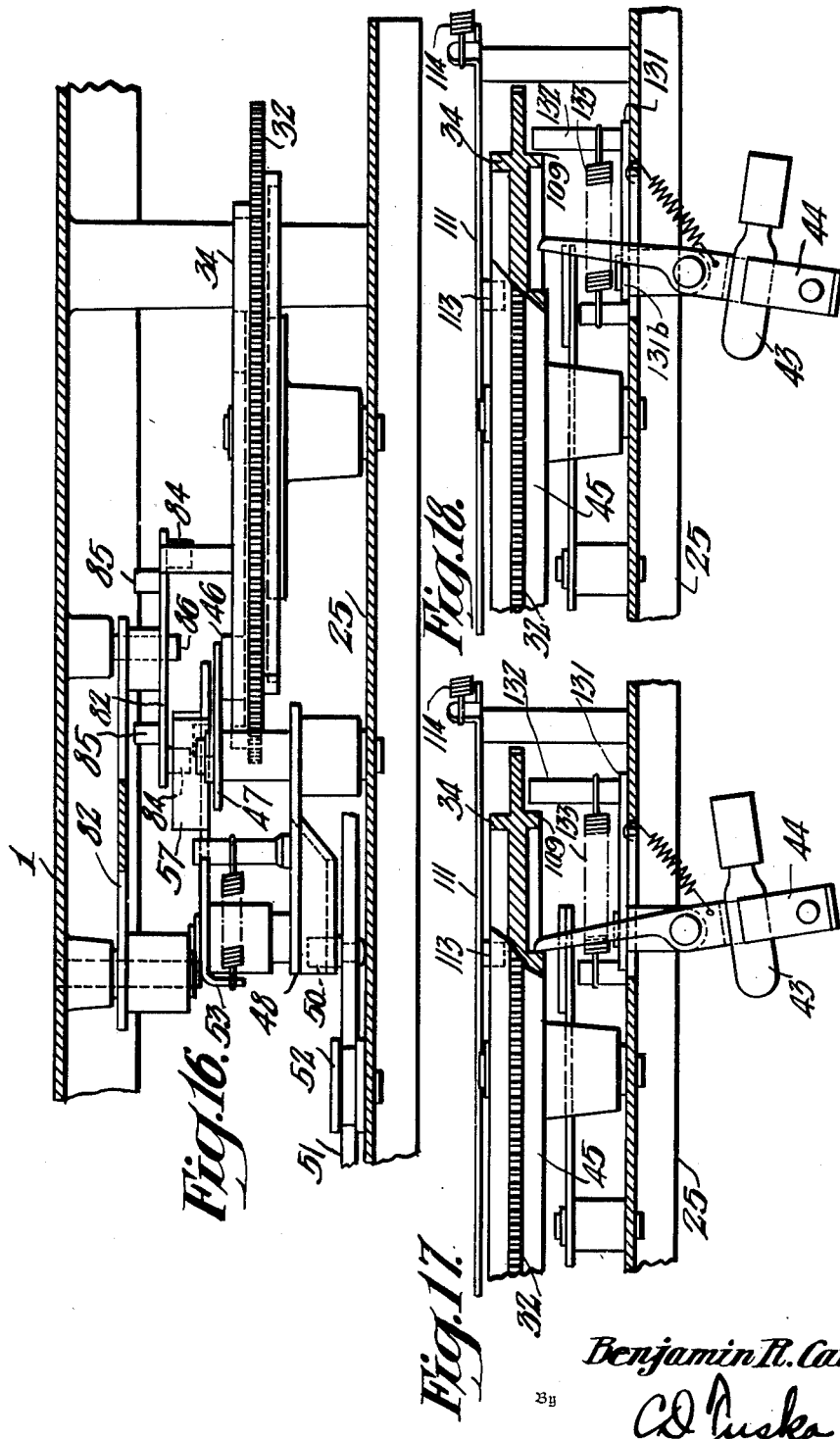

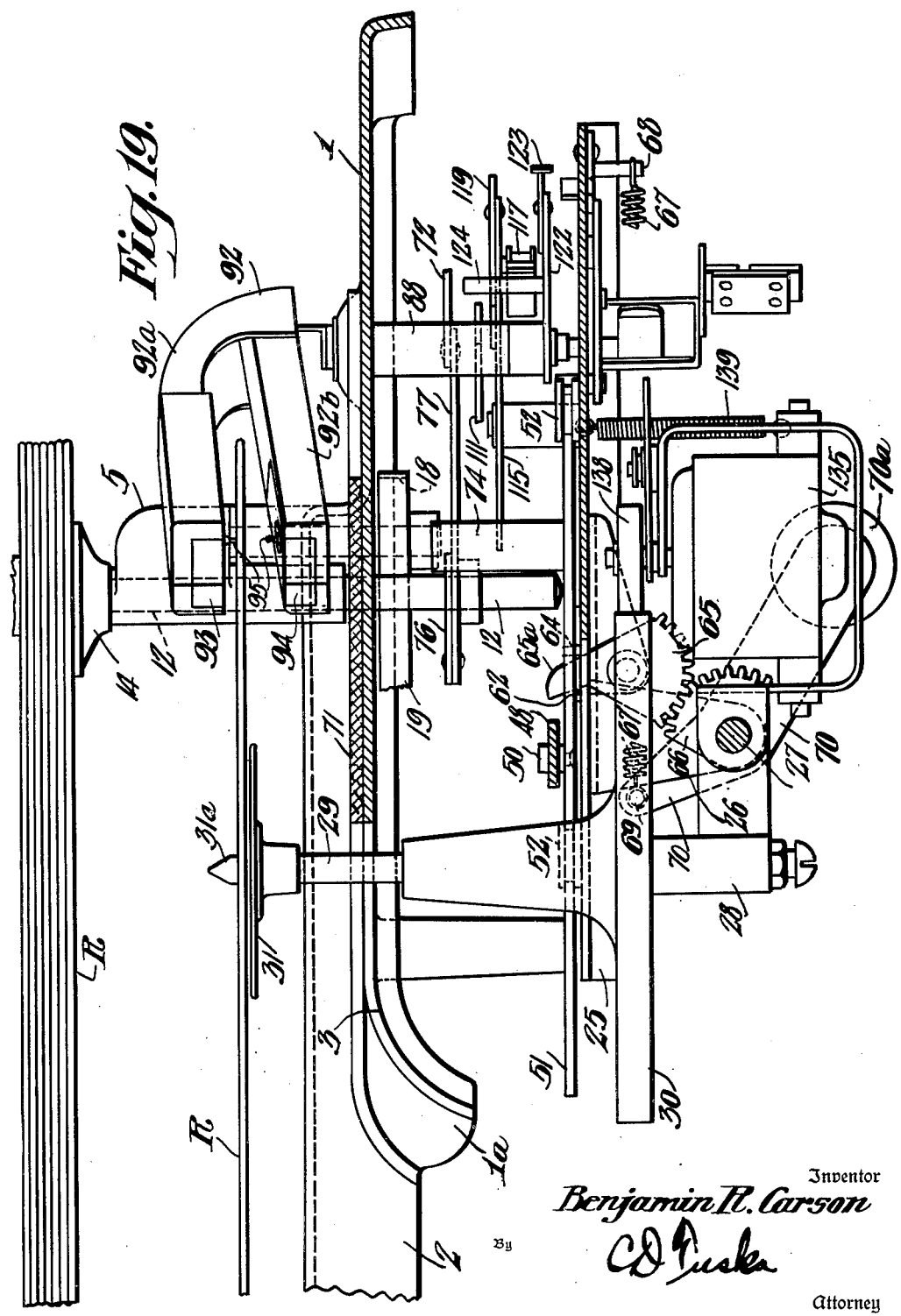

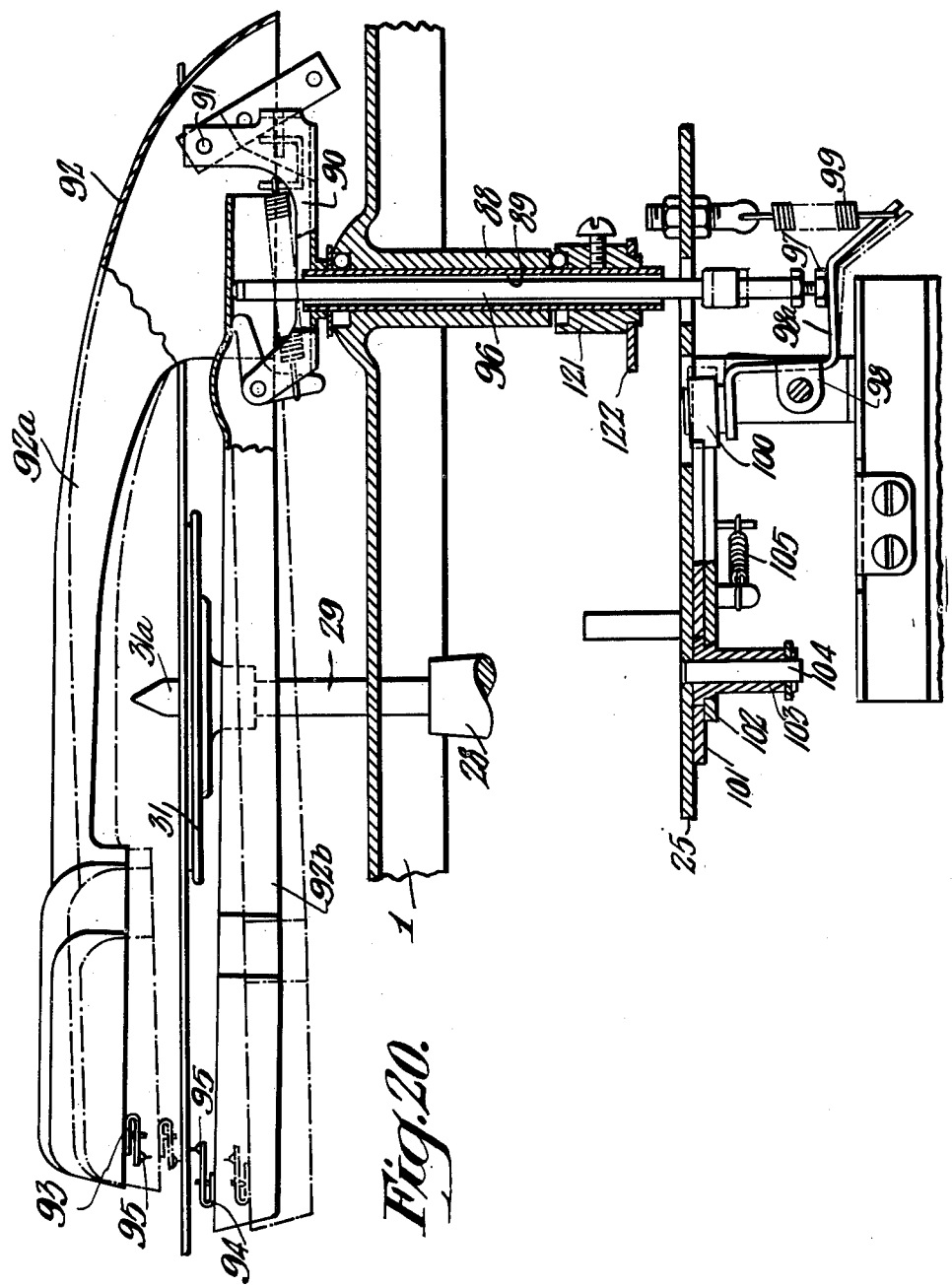

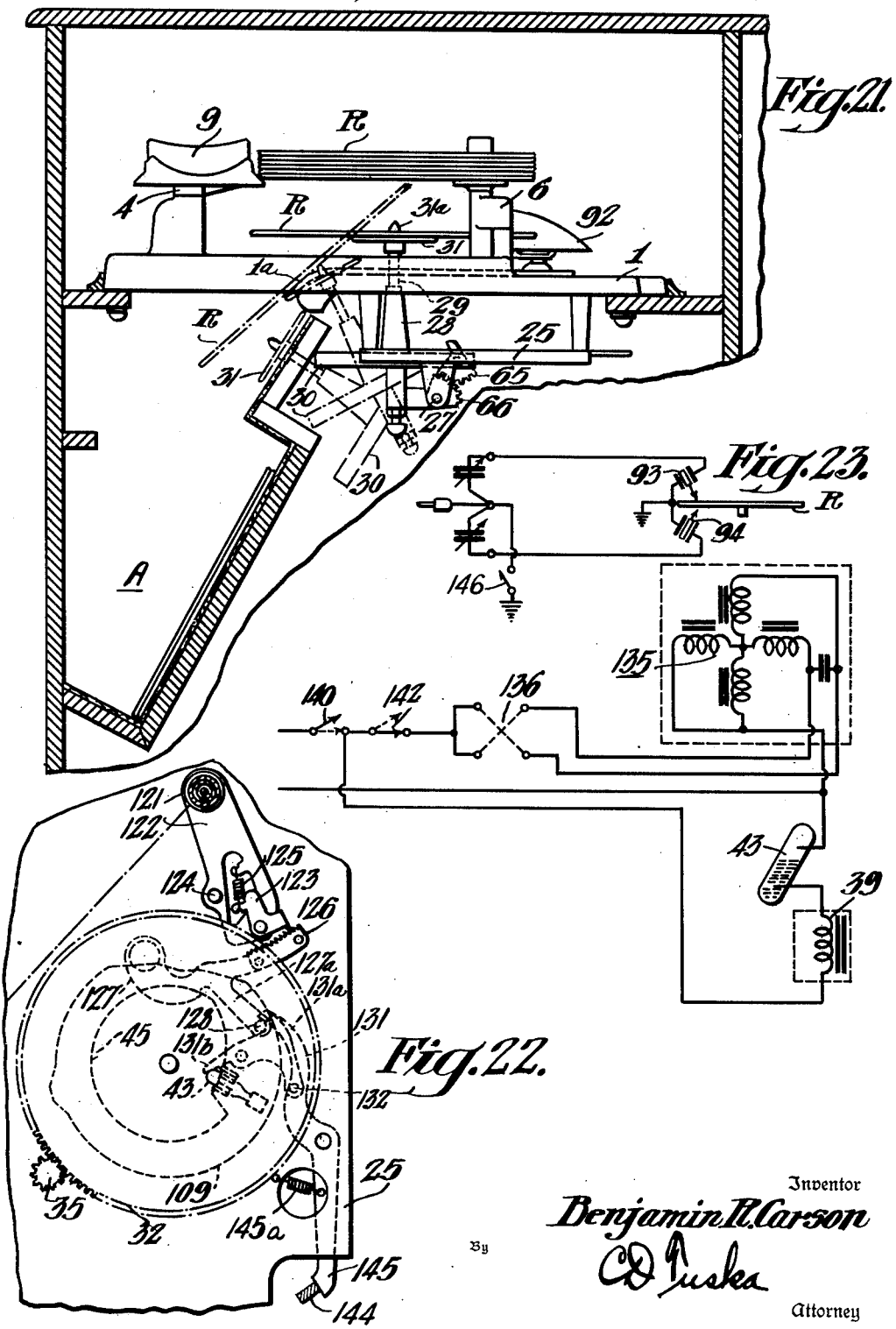

Patented Dec. 23, 1952

2,622,884

UNITED STATES PATENT OFFICE 2,622,884

PHONOGRAPH

Benjamin R. Carson, Haddonfield, N. J., assignor to Radio Corporation of America, a corporation of Delaware Application August 28, 1942, Serial No. 456,518

25 Claims. (Cl. 274—10)

This invention relates to phonographs, and more particularly to an automatic phonograph of the type wherein a plurality of records are supported above the turntable to be successively lowered onto the turntable for playing.

In phonographs of this type, as heretofore constructed, the records have been stacked on suitable supporting members above the turntable to be successively released from the stack and dropped onto the turntable for playing. The records which are dropped from the stack in succession eventually accumulate on the turntable, the last dropped record, in each case, becoming the new topmost record to be played on the stack which accumulates on the turntable. Thus, not only is the load on the motor constantly increased as each new record is deposited on the turntable supported stack, but it is obvious that only the upper side of each record can be played.

The primary object of my present invention is to provide an improved phonograph of the type set forth which will not be subject to the aforementioned limitations characteristic of prior art phonographs of the drop type.

More particularly, it is an object of my present invention to provide an improved drop type automatic phonograph which will play either one or both sides of a plurality of records in succession at will without having to turn the records over when playing both sides.

Another object of my present invention is to provide an improved automatic phonograph as aforesaid which will require small cabinet space.

A further object of my present invention is to provide an improved phonograph of the type set forth which will not only play records automatically, but which will also play records manually either on one or both sides, as desired, and which will shut off automatically after the record has been played without any further attention on the part of the user after a record has once been deposited for playing.

Still a further object of my present invention is to provide an improved drop type phonograph as aforesaid wherein the load on the turntable driving motor will always be constant.

Another object of my present invention is to provide an improved automatic phonograph as above set forth which will shut off automatically after the last record has been played and discharged from the turntable.

Still another object of my present invention is to provide an improved phonograph of the type set forth which will play standard records of either small diameter or large diameter.

A further object of my present invention is to provide an improved phonograph of the type set forth wherein the needle pressure on the records is very light, thereby insuring long life for the records as well as for the sound reproducing instrumentalities.

It is also an object of my present invention to provide an improved phonograph as aforesaid which is very compact, extremely accurate and efficient in operation, which comprises a minimum number of parts considering the functions which it is to perform, and which is relatively inexpensive to manufacture.

In accordance with my present invention, I provide a platform having a record discharge opening and a slot which leads from this opening. A plurality of record supporting members on the platform support a vertically extending stack of records above the platform. Extending through the aforementioned slot is a tiltable turntable shaft which carries a small turntable arranged to occupy a playing position above the platform and in substantially axial alignment with the stack of records. The turntable is of a diameter somewhat smaller than the diameter of the conventional labels on standard records. Thus, both the upper and lower grooved areas of a standard record resting on the turntable are exposed for playing. A pick-up arm carrying upper and lower pick-ups for cooperation, respectively, with the upper and lower sides of a record on the turntable is pivotally mounted on the platform for both vertical and horizontal movement.

With a group of either ten inch or twelve inch records stacked on the record supporting members (these members being adjustable to accommodate records of either size), the machine is started by turning on the main power switch and then pressing a starting button. A cycle motor is thus energized to cause the turntable shaft to swing down or tilt through the aforementioned slot and to carry the turntable down through the discharge opening in the platform. The lowermost record of the elevated stack is then released to drop down onto the platform. The turntable then rises, engages the lower surface of the dropped record to carry it to a centering position for centering the record on the turntable spindle, and then moves to its normal or playing position with the dropped record thereon. The cycle motor is then de-energized and the turntable is coupled to a turntable driving motor which has previously been energized.

Assuming that the machine has been preset to play both sides of the record, the pick-up arm then moves in to bring the upper one of the two pick-ups into engagement with the upper surface of the record, the turntable motor operating to drive the turntable and its record in a clockwise direction, as in conventional phonographs. At the completion of the playing of the upper side of the record, the pick-up arm operates a trip device to (1) cause the cycle motor to become energized again to operate mechanism which raises the upper pick-up from the record and swings the pick-up arm clear thereof, (2) cause the turntable motor to reverse to thereby drive the turntable and its record in a counterclockwise direction, and (3) effect return of the pick-up arm with the lower pick-up in engagement with the lower surface of the same record, after which the cycle motor is again shut off. When the lower side of the record has been played, the pick-up arm again actuates the trip mechanism to complete the circuit to the cycle motor and the pick-up arm is lowered somewhat and swung clear of the played record. Thereupon, the turntable is tilted to effect discharge of the record carried thereby through the above mentioned opening in the record platform and into a played record bin or receptacle. The then lowermost record of the elevated stack is released to drop down onto the platform, and the cycle is repeated until all of the records have been played. When the lower side of the last record has been played and the record has been discharged, the machine is automatically shut off when the pick-up arm, having no record to engage on the turntable, is lowered onto a stop switch which shuts off the mechanism.

If it is desired to play only one side of each record, the machine is preset for such operation by suitable index mechanism. In that event, the above-mentioned cycle is followed except that the turntable motor is not reversed and each record is discharged after the upper side thereof has been reproduced.

For manual operation of the machine, it may be indexed to play either one side or both sides of the record, as desired. The record to be played is placed upon the record supporting members above the aforementioned platform, and the starting button is operated. The record then drops down onto the platform as above described and the aforementioned cycle is followed until the record has been played, after which the machine shuts off automatically.

The novel features that I consider characteristic of my invention are set forth with particularity in the appended claims. The invention itself, however, both as to its organization and method of operation, together with additional objects and advantages thereof, will best be understood from the following description of one specific embodiment thereof, when read in connection with the accompanying drawings, in which Figure 1 is a top plan view of a phonograph constructed in accordance with this invention, the machine being shown adjusted to play only one side of a stack of ten inch records, and showing the pick-up arm in the starting position for reproducing the upper side of each record.

Figure 3:
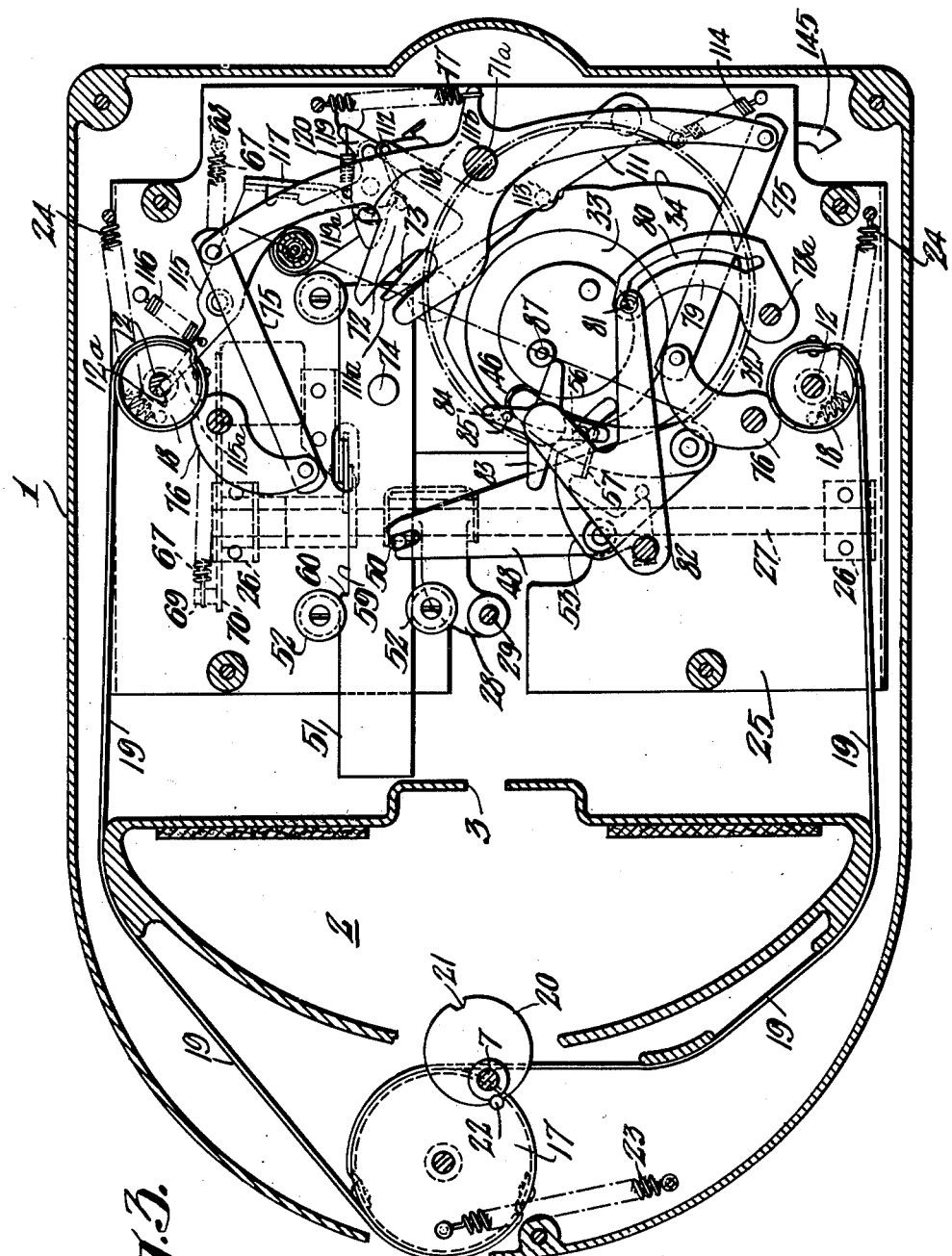
Figure 3 is a sectional view taken on the line III—III of Fig. 2.
Figure 4:
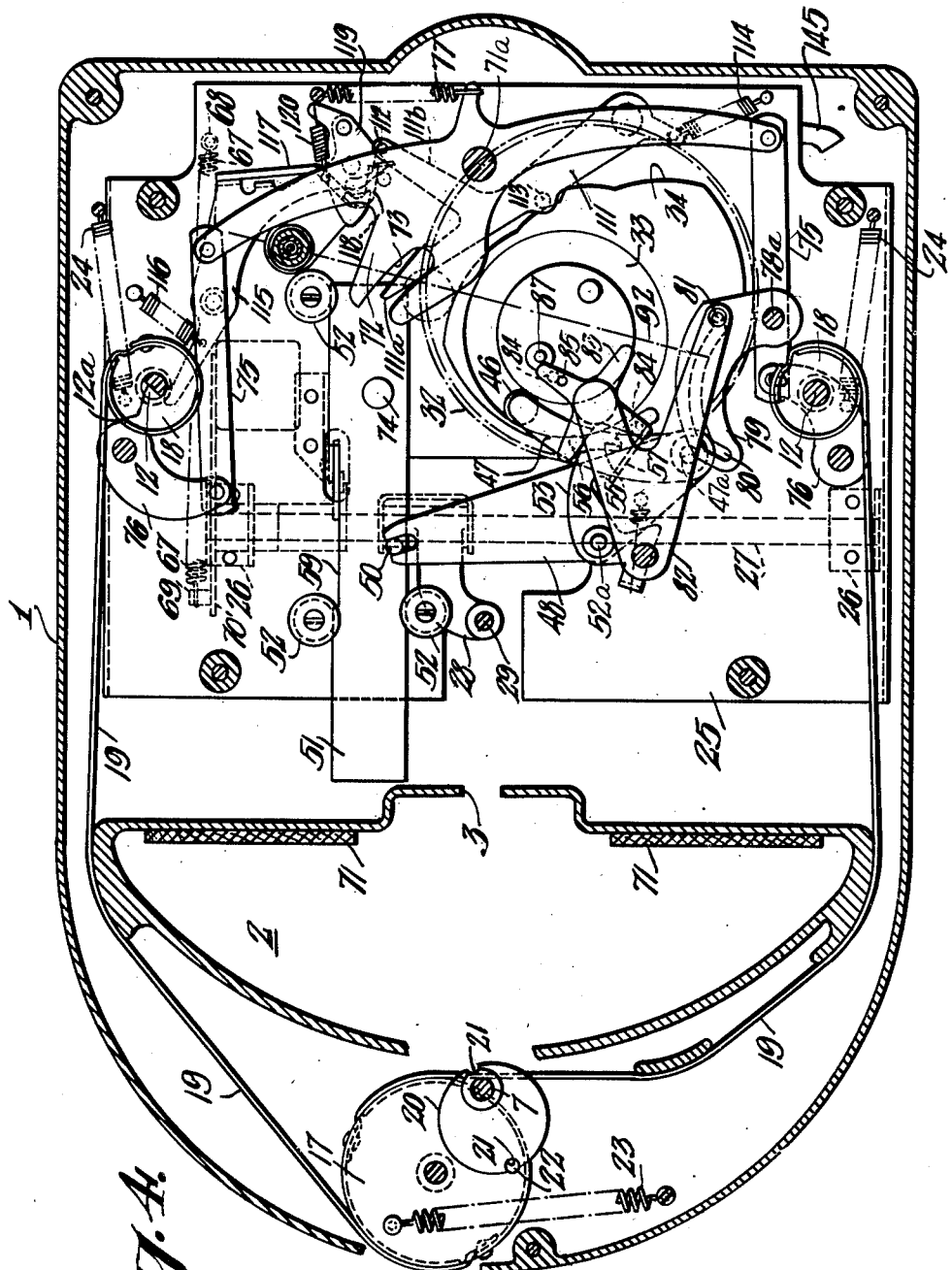
Figure 5:
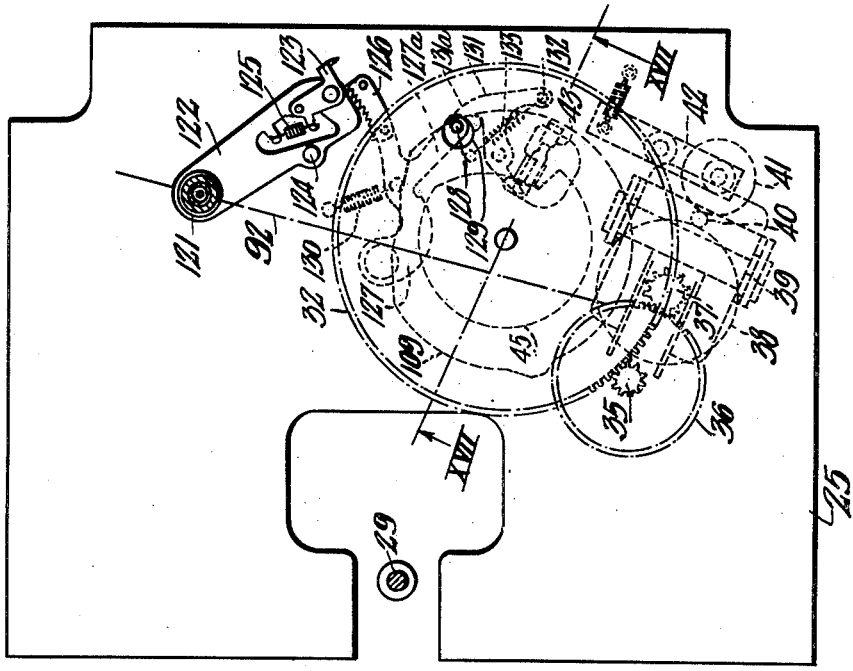
Figure 6:
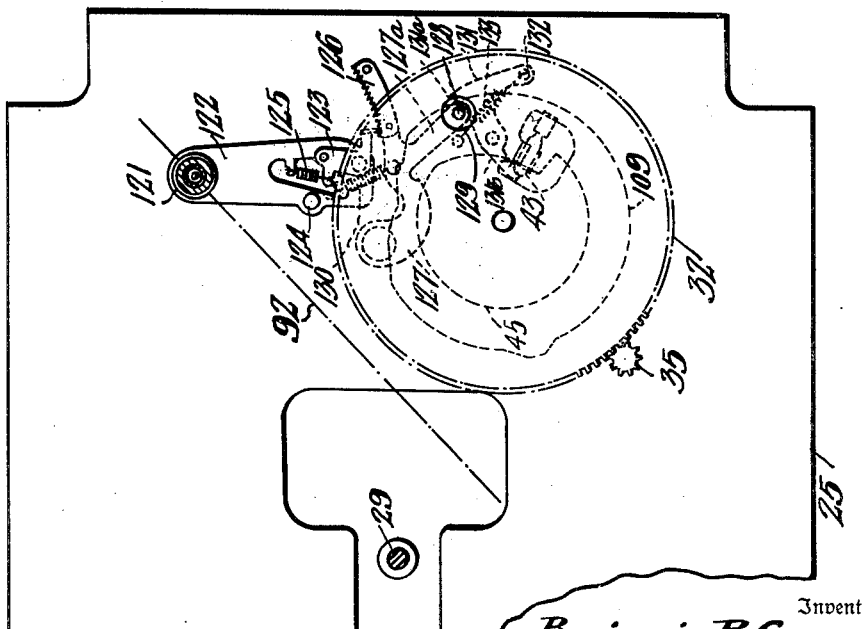

Figure 4 is a sectional view similar to Fig. 3 but showing the parts in the starting position for reproducing twelve inch records, Figure 5 is a top plan view of the bottom plate assembly with certain of the parts removed for the sake of clearness and showing particularly the pick-up arm tripping mechanism and the switch device which controls the cycle motor, Figure 6 is a view similar to Fig. 5 but showing the position of the parts just after the pick-up arm has reached the eccentric terminal groove of the record, the cycle controlling switch having been actuated and the master gear assembly ready to begin rotating, Figure 7 is a view corresponding to Fig. 4 but showing the position of the parts after the pick-up arm has been raised from the upper surface of the record and moved to a position clear of the played record, Figure 8 is a view similar to Fig. 7 but showing the separator lever assembly in the position wherein a new record is released from the stack, Fig. 9 is a view similar to Figs. 7 and 8 but showing the star wheel pin on the master gear engaging the star wheel to adjust it to effect playing of the lower side of the record and with the slide throw-out lever about to be released from engagement with the slide, Figure 10 is a view similar to Fig. 9 but showing the throw-out lever out of engagement with the slide, the slide in its rest position, and the pick-up arm in a position while being moved outwardly for the next record.

Figure 1:
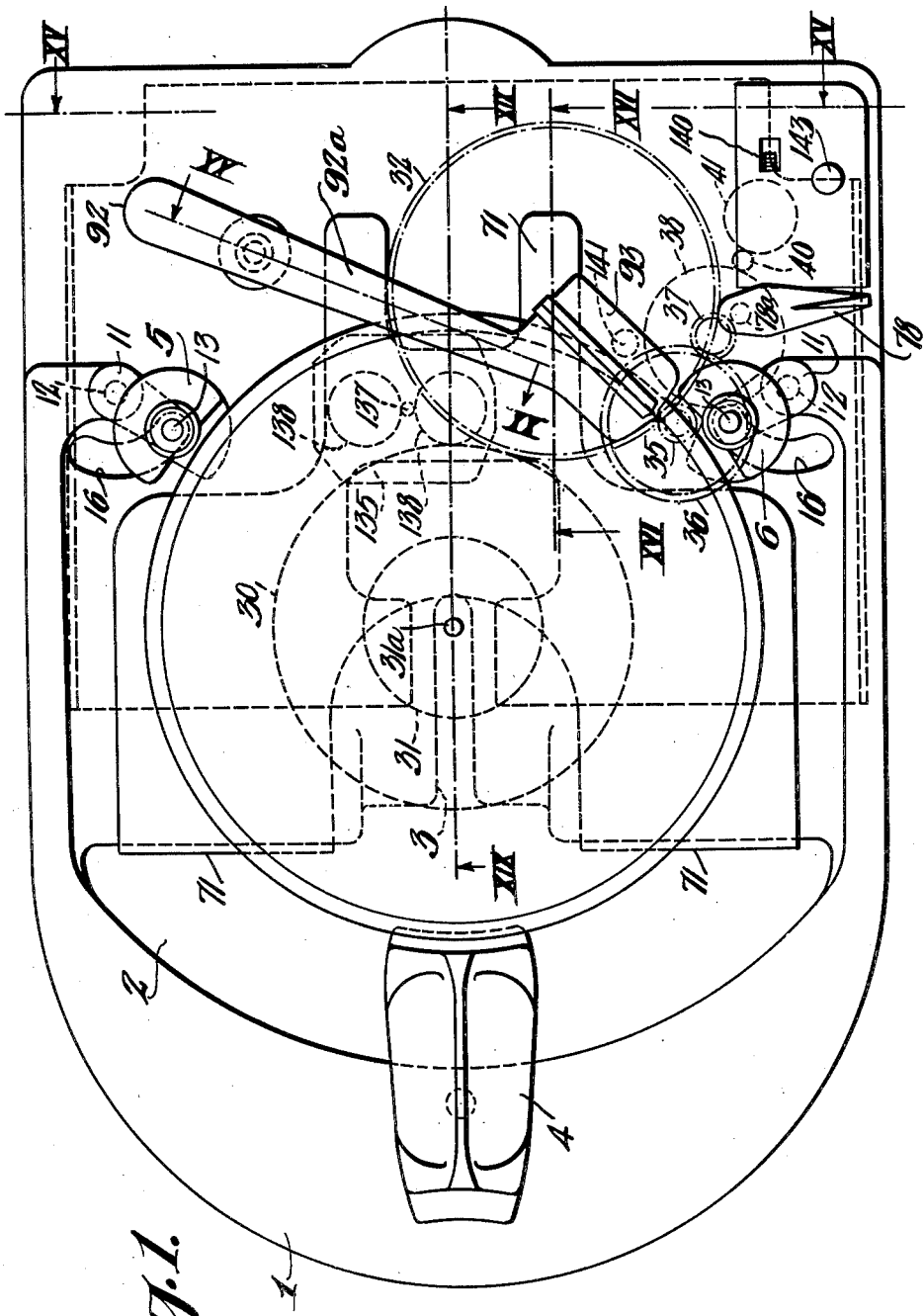
Figure 15:
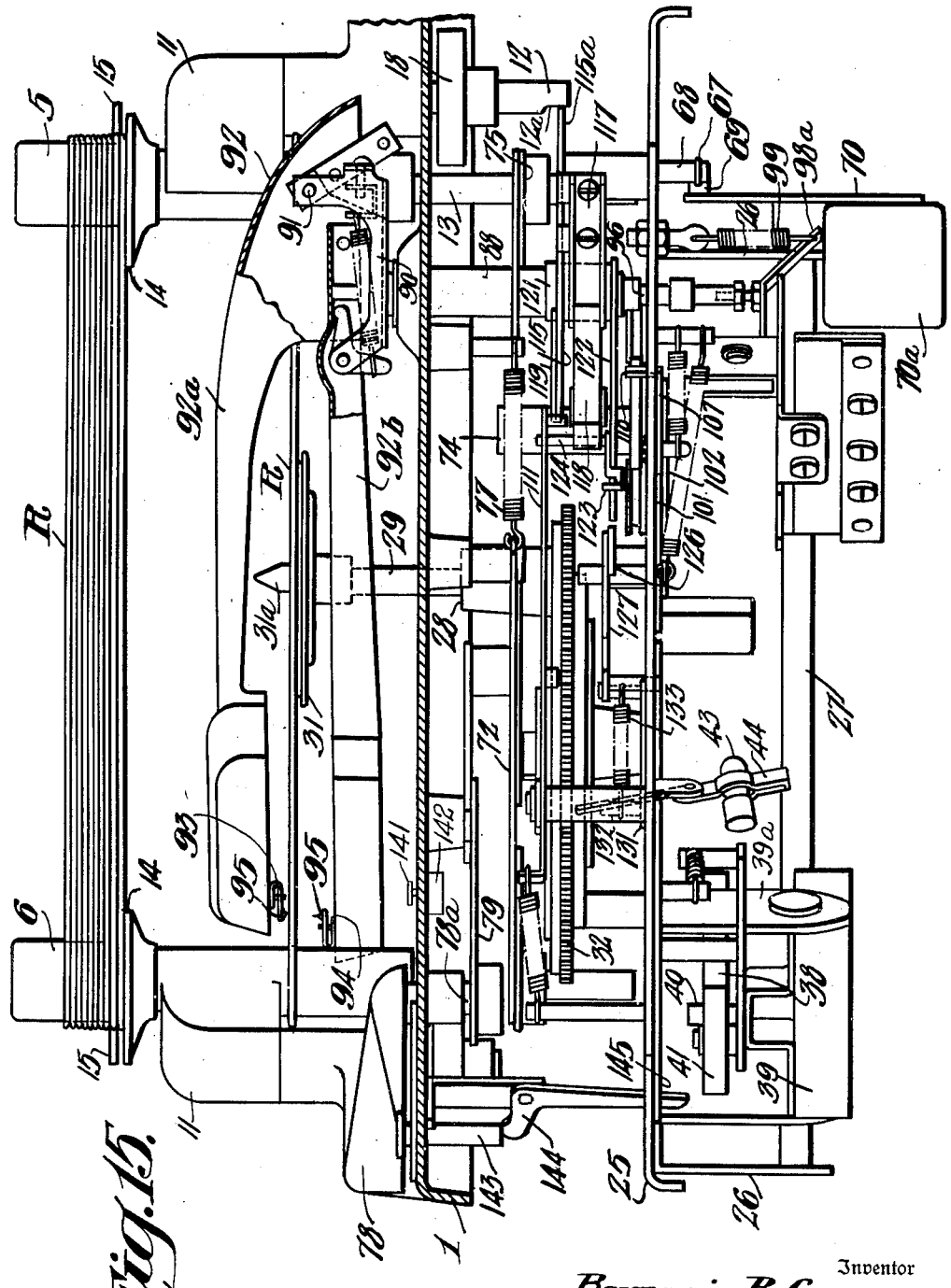

Figures 11, 12 and 13 are fragmentary top plan views showing various positions of the tone arm control lever with respect to the turntable motor reversing switch and the cycle motor switch, Figure 14 is a view similar to Figs. 11, 12 and 13 but showing, in detail, the pick-up shorting switch, Figure 15 is an enlarged sectional view taken on the line XV—XV of Fig. 1, Figure 16 is an enlarged sectional view taken on the line XVI—XVI of Fig. 1, Figure 17 is an enlarged sectional view taken on the line XVII—XVII of Fig. 5, and showing the cycle motor switch in the position before it has been tripped, Figure 18 is an enlarged sectional view similar to Fig. 17, but showing the cycle motor switch in the position after it has been tripped, Figure 19 is an enlarged sectional view taken along the line XIX—XIX of Fig. 1, and showing in detail, the mechanism for tilting the turntable.

Figure 20 is an enlarged sectional view taken along the line XX—XX of Fig. 1 and showing, in detail, the pickup arm supporting and actuating mechanism, the pick-up arm being shown in the position wherein the lower pick-up engages the lower surface of a record on the turntable.

Figure 21 is a central sectional view through a cabinet housing a phonograph according to my present invention and showing the different positions of the turntable during the record discharging operation.

Figure 22 is a bottom plan view similar to Fig. 5 but showing the combined start and reject lever added, and Figure 23 is a wiring diagram of the circuit arrangement employed in this phonograph.

Referring more particularly to the drawings, wherein similar reference characters designate corresponding parts throughout, there is shown a main frame or platform 1 having a record discharge opening 2 with which communicates a slot 3. Mounted upon the upper surface of the main plate 1 and extending upwardly therefrom are a plurality of record supporting members 4, 5 and 6 adapted to support a stack of records R above the platform 1. The record supporting member 4 comprises a post 7 mounted in a bearing member 8 on the platform 1 for rotation only on its own axis. The post 7 terminates at its upper end in a head 9 provided with diametrically opposed portions 9a and 9b terminating, respectively, in downwardly extended ledges 10a and 10b at different radial distances from the post 7 and inclined downwardly away from the post 7. The members 5 and 6 each comprise a support 11 carrying a rotatable post 13 mounted in the supports 11 for rotation on their own respective axes. The supports 11, in turn, are mounted for rotation on bearing pins 12 on the platform 1 for movement bodily with the posts 12 on an axis parallel, in each case, to the axis of the post 13. Each of the posts 13 is provided adjacent its upper end with a record supporting shelf 14 and a record separator 15. When the stack of records is placed upon the record supporting members, the lowermost record rests upon the shelves 14 and one or the other of the inclined ledges 10a or 10b. Successive lowermost records of the stack are released, one at a time, by rotation of only the posts 13, the shelves 14 riding out from under the lowermost record and the separators 15 riding under the next lowermost record to restrain the remaining records of the stack from following the lowermost record, in well known manner. This construction is similar to that disclosed in my Patent No. 2,280,685 and is not believed to require further description here.

The platform 1 is provided with a pair of arcuate slots 16 through which the posts 13 extend and in which they are movable on the bearings 12. At one extreme end of the slots 16, the posts 12 are at a smaller radial distance from the spindle of a turntable presently to be described than they are when disposed at the other extreme end of their associated slots 16. The post 7 is rotatable in its bearing 8 for rotation through 180 degrees in either direction to bring either one of the ledges 10a or 10b closest to the turntable. This arrangement is for the purpose of accommodating the machine to either ten-inch or twelve-inch records.

The record supporting members 4, 5 and 6 are arranged to move in unison merely by adjustment of the head 9 in one direction or the other. For this purpose, there is rotatably mounted on the underside of the platform 1 a drum 17 (Fig. 3), and to the lower end of each of the pins 12 is fixed a drum 18. A pair of flexible tapes or bands 19 connect the drums 17 and 18. Secured to the bottom of the post 7 is an eccentric disc 20 having a pair of diametrically opposed notches 21 therein adapted to cooperate with a pin 22 mounted on the drum 17. The notches 21 are so arranged relative to the post 7 that, when either one or the other is in engagement with the pin 22, either the ledge 10a or the ledge 10b of the supporting head 9 will be closest to the turntable for reception of either ten-inch or twelve-inch records, as the case may be. When the head 9 is turned, the eccentric disc 20 is turned with it and, acting against the pin 22, rotates the drum 17 to thereby actuate the tapes 19 to also rotate the drums 18. A spring 23 constantly maintains the pin 22 in engagement with the cam disc 20, and a pair of springs 24 connected to the drums 18 are arranged to insure the drums 18 following the tapes 19. Thus, by merely rotating the head 9 of the supporting member 4 one way or the other, the posts 12 will be caused to move in the arcuate slots 16 to assume one or the other of the desired positions.

Suspended from the main, top plate or platform 1 is a bottom plate 25 provided with a pair of downwardly extending ledges 26 which rotatably carry a shaft 27. Secured to the shaft 27 for rotation therewith is a bearing member 28 which rotatably carries a turntable shaft 29 having secured thereto a driving wheel or disc 30. The turntable shaft 29 is arranged to extend through the slot 3 and is adapted to tilt therein upon rotation of the shaft 27. At its upper end, the turntable shaft 29 carries a small turntable 31 which normally occupies a horizontal playing position above the platform 1 and below the record stack R and in substantially axial alignment with the record stack. The turntable 31 is of a diameter somewhat smaller than the label area of conventional phonograph records, so that the turntable engages only the central, ungrooved portion of the lower side of the record and leaves the grooves on both sides of the record exposed for playing.

Figure 2:
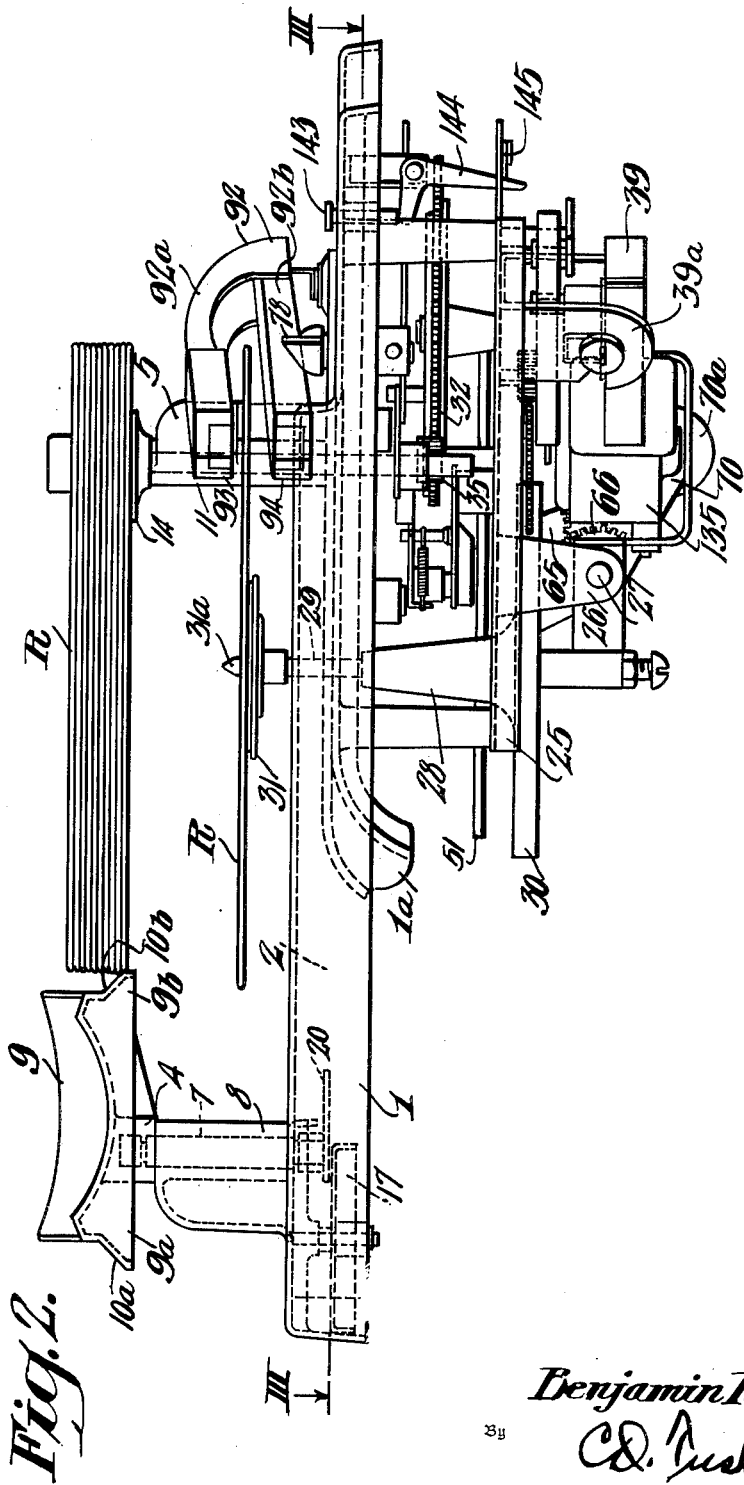
Figure 2 is a front elevation thereof, with certain of the parts omitted for the sake of clearness.

In the operation of the machine, the turntable shaft 29 is first tilted, by mechanism presently to be described, to substantially the lowermost position shown in Fig. 21, whereupon the lowermost record of the stack is released to drop onto the platform 1. The turntable is then raised and, in its upward movement, its spindle 31a engages the dropped record now on the platform 1, raises it from the platform and forces it, by friction, against the record-supporting members 5 and 6 which center the record on the turntable to cause it to become threaded on the spindle 31a. The turntable then assumes the normal, horizontal, playing position, as shown in Figs. 2, 15 and 20, for example, and the record is played.

To effect tilting of the turntable and rotation of the record supports 5 and 6, there is rotatably mounted on the upper surface of the bottom plate 25 a master gear 32 formed on its upper surface with an eccentric cam track 33 and with a cam 34. The gear 32 meshes with a pinion 35 (Figs. 5 and 6) fixed to a shaft which extends through the bottom plate 25, a gear 36 being connected to the lower end of this shaft and meshing with a pinion 37 mounted on the same shaft as a friction wheel 38. A cycle motor 39 is pivotally carried by a bracket 39a secured to the lower surface of the bottom plate 25 and has a driving shaft 40 which is in engagement with the friction wheel 38. The drive shaft 40 is constantly pressed against the friction wheel 38 by a friction idler 41 floatingly carried by a lever 42. Thus, whenever the motor 39 is energized, the master gear 32 is rotated. The motor 39 is energized through a mercury or other suitable switch 43 carried on a pivotally mounted lever 44 which extends up through an opening in the bottom plate 25 into engagement with a cam 45 on the bottom surface of the master gear 32, as most clearly seen in Figs 17 and 18.

The cam track 33 cooperates with a roller 46 on one end of a lever 47 rotatable on a post 47a carried by the bottom plate 25. Also rotatable on the same post is a slide lever 48 having a notch 49 at one end in which is received a pin 50 on a slide bar 51. The slide bar 51 is mounted for movement between a plurality of cooperating spool-shaped rollers 52 which are rotatable on the bottom plate 25, the slide 51 slightly spaced above the bottom plate 25, as best seen in Fig. 19.

Pivotally carried by the slide lever 48 on a pin 52a is a slide throw-out lever 53 terminating in an arcuate cam surface 54 beyond a notch 55. The notch 55 is adapted to receive and cooperate with an upstanding pin 56 on the lever 47. The throw-out lever 53 is also provided with an upstanding wall 57 adjacent the notch 55. A coil spring 58 biases the throw-out lever 53 in a counter-clockwise direction to urge the notch 55 into engagement with the pin 56.

The slide 51 is provided with a cut-out 59 terminating at one end in a shoulder 60. Pivotally mounted on the top plate 25 in the space between the top plate and the slide bar 51 is a substantially L-shaped lever 61 terminating at one end in a toe 62 and at its other end in a cam edge 63. The slide 51 carries a downwardly extending pin 64 which is arranged to ride along the adjacent edge of the lever 61 and to cooperate with the cam edge 63. The toe 62 is engaged by the upper end 65a of a segment gear 65 which is pivotally carried by the bottom plate 25 and which meshes with a second segment gear 66 fixed to the shaft 27 (see Fig. 19). A coil spring 67 connected between a fixed pin 68 on the bottom plate 25 and a pin 69 on the upper end of a counterweight lever 70 fixed to the shaft 27 and having a counter-balancing weight 70a thereon constantly urges the lever 70 and the gear sector 66 in a direction to rotate the gear sector 65 to bring its upper end 65a into engagement with the toe 62 of the lever 61. Thus, since the lever 61 is constantly urged counterclockwise, as view in Figs. 7 to 10, it will be in engagement with the pin 64. The weight 70a partly counterbalances the weight of the turntable assembly comprising the bearing 28, the shaft 29, the wheel 30, and the turntable 31, as best seen from Fig. 19, and therefore lightens the burden of the spring 67.

When the master gear 32 begins to rotate in a clockwise direction in response to the cycle motor 39 (as viewed in Figs. 9 and 10), the lever 47 is rotated in a clockwise direction and its pin 56 pulls the throw-out lever 53 with it and thereby causes the slide lever 48 also to rotate clockwise. The slot 49 of the slide lever 48, acting on the cooperating slide pin 50, causes the slide 51 to move to the right. As soon as the pin 64 reaches the cam edge 63 of the lever 61, the lever 61 becomes free to rotate in a counter-clockwise direction in response to actuation by the member 65a. Since the gear sector 65 is now rotating counter-clockwise (as viewed in Fig. 19), the gear sector 66 rotates clockwise to cause the turntable assembly also to rotate clockwise toward the rotatable record supports 5 and 6. Shortly thereafter, the shoulder 60 engages the upper end 65a of the gear sector 65 and, by its continued forward movement in response to the slide lever 48, rotates the gear sector 65 in a clockwise direction. This, in turn, produces counter-clockwise rotation of the gear sector 66 (Fig. 19) to tilt the turntable assembly through the slot 3 to thereby withdraw the turntable 31 through the opening 2. The platform 1 is formed with an apron or the like 1a which is engaged by the record being carried down through the opening by the turntable 31, the apron 1a camming the turntable-carried record away from the turntable, as shown in dot and dash lines in Fig. 21. The record is thus discharged from the turntable and drops down into a played record receptacle A.

At this point, the posts 12 of the rotatable record supporting members 5 and 6 are rotated to release the lowermost record of the stack. The released record drops down onto a felt pad 71 on the platform 1, being urged toward the supporting members 5 and 6 by the inclination of either ledge 10a or 10b, as the case may be, depending upon whether ten inch or twelve inch records are being played, and in a manner more fully set forth in my above mentioned Patent No. 2,280,685. After the record has dropped onto the platform 1, the slide 51 begins its return movement, and the gear sector 65 follows the shoulder 60 in response to the spring 67, thereby permitting the spring 67 to effect elevation of the turntable. Eventually, the turntable spindle 31a engages the lower label area of the dropped record, raises that record and at the same time forces it against the supporting members 5 and 6 which center the record on the turntable. At this point, the turntable has moved somewhat beyond its normal, horizontal, playing position. Immediately thereafter, the pin 64 comes into contact with the cam edge 63 of the lever 61, as shown in Fig. 7, and the pin 64, riding along the cam edge 63, rotates the lever 61 clockwise. This produces clockwise movement of the gear sector 65 (as viewed in Fig. 19), thereby rotating the gear segment 66 counter-clockwise and causing the turntable assembly to back away somewhat in order to bring the turntable back into its playing position.

Pivotally mounted on a stud 71a on the underside of the platform 1 is a control lever 72 for controlling release of the records from the stack one at a time in succession. The lever 72 is formed with a slot 73 with which an unstanding post 74 on the slide 51 cooperates. The ends of the lever 72 are connected by links 75 to a pair of cranks 76, each of which is secured to the lower end of a pin 12. At the appropriate time in the forward travel of the slide 51, the post 74 comes into engagement with the slot 73 and causes the lever 72 to rotate clockwise, as viewed in Figs. 3, 4 and 7 to 10, inclusive. Clockwise rotation of the lever 72 causes the links 75 to rotate the cranks 76 in a direction such that their associated separating knives 15 enter between the lowermost and the next lowermost record of the stack while the record supporting shelves 14 are withdrawn from the lowermost record. In this way, the lowermost record is released. Upon return movement of the slide 51, the post 74 is withdrawn from the slot 73, and a spring 77 restores the lever 72 to its rest position.

As described thus far, the mechanism operates without regard to whether only one side of the record is to be played or whether both sides thereof are to be played before it is discharged from the turntable. For controlling the playing of either one or both sides at will, there is provided on the top plate 1 a manually operable, rotatable index lever 78 (Fig. 1). The lever 78 is mounted on a rotatable post 78a which extends through the main plate 1 and to the lower end of which is secured a star wheel control lever 79 formed with a slot 80 in which is received a pin 81 on a star wheel lever 82. The lever 82 is pivotally carried on the lower side of the top plate 1 and has pivotally mounted thereon a star wheel 83 having four arms. Two diametrically opposed arms of the star wheel are provided each with a downwardly extending pin 84 and with an upwardly extending pin 85, the pins 85 being adapted to coact with a fixed pin 86 on the bottom of the top plate 1.

When the index lever 78 is set in the position shown in Fig. 1, which is the "Load" as well as the "One Side" position, the lever 79 forces the star wheel lever 82 into a position such as shown in Fig. 3. In this position, the star wheel is thrown clear of the upstanding wall 57 of the lever 53, and the mechanism goes through its complete cycle after only the upper side of the record has been played. However, when the index lever 78 is moved to the "Two Side" position, removed 90 degrees counter-clockwise from the position shown in Fig. 1, the lever 79 is actuated to bring the star wheel lever 82 into the position shown in Fig. 4. When the star wheel is in this position, each time the master gear 32 rotates, an upstanding pin 87 thereon engages one of the arms of the star wheel 83 and rotates the star wheel 90 degrees. Since only every other arm of the star wheel 83 is provided with a downwardly extending pin 84, it is obvious that only on every other revolution of the master gear 32 will one of the pins 84 be brought up against the upstanding wall 57 of the lever 53 to cam the lever 53 away from the pin 56. Consequently, when this happens, the lever 47 will continue to rotate in response to the cam track 33, but it will not actuate the slide lever 46, and therefore the turntable will not be tilted to discharge the record. The pins 85 are provided on the upper portion of the star wheel for coaction with the fixed pin 86 to reset the star wheel to the proper position relative to its lever 82 each time the index lever 78 is moved to the "Load" position. Any suitable means may be provided to insure friction between the star wheel 83 and its lever 82 to insure the star wheel holding its adjusted position relative to the lever 82.

Extending downwardly from the top plate 1 is a bushing 88 in which is rotatably received a sleeve 89 to the upper end of which is secured a bracket 90. Pivotally mounted on the bracket 90 on a pair of opposed bearing members 91 (only one of which is visible in Figure 15) is a pickup arm 92 having a branch 92a which carries a removable sound translating device 93 and cooperates with the upper side of a record, and a branch 92b which carries a removable pick-up 94 which cooperates with the lower side of a record on the turntable. Each of the pick-ups 93 and 94 preferably includes a permanent point needle 95 which may be of any suitable type, and the pick-up devices are preferably removably mounted on their respective branches 92a and 92b in the manner shown more fully in the Guedon Patent No. 2,320,427.

Slidably mounted in the sleeve 89 is an elevating post or rod 96, the lower end of which carries an adjustable screw 97. The screw 97 rests against the horizontal arm 98a of a pivoted bracket 98 which is constantly urged in a counter-clockwise direction (as viewed in Fig. 20) by a spring 99. The upper end of the bracket 98 carries a roller 100 which cooperates with a pair of superposed cams 101 and 102 rotatable on a bushing 103 carried by a downwardly extending pin 104 on the bottom plate 25. A coil spring 105 constantly tends to bring the cams 101 and 102 into the relation shown in Figs. 11 and 12 and a coil spring 106 constantly tends to rotate the cams 101 and 102 as a unit in a counter-clockwise direction, as seen in Figs. 11, 12 and 13, to hold the cam assembly 101, 102 against the roller 100. The cam 101 is provided with a toe 101a adapted to be latched by a latching lever 107. The cam 101 is also provided with a cam surface 101b which extends beyond the adjacent cam surface 102a of cam 102.

The cam 102 is provided with a pin 108 which is engaged by a cam 109 on the lower surface of the main gear 32. When the gear 32 begins to rotate, the high point 109a of its cam 109 rotates the cam assembly 101, 102 clockwise (as seen in Figs. 11 to 13) to bring the toe 101a into latching engagement with the latching member 107. The latch lever 107 is provided with an upstanding member 110 which extends up through the bottom plate 25 and is interposed in the path of movement of the slide 51. Each time the slide 51 advances to its forwardmost position, it engages the upstanding portion 110 to cause the lever 107 to become unlatched from the toe 101a. When the machine is preset to play only one side of each record, the slide 51 will advance on every revolution of the main gear 32, as above described. Consequently, the lever 107 will be unlatched from the toe 101a after one side of the record only has been played. On the other hand, when the machine is set to play both sides of each record, since the star wheel 83 blocks advance of the slide 51 on every other revolution of the main gear 32, it follows that the latch lever 107 will be unlatched from the toe 101a on every other revolution of the main gear 32.

When only one side of each record is to be played, the cam edge 101b engages the roller 100 and turns the bracket 98 in a clockwise direction, as seen in Fig. 20. This permits the pick-up arm 92 to be lowered to bring the pick-up 93 into engagement with the upper surface of the record, and this operation takes place during each cycle. However, if both sides of a record are to be played, then, on every other rotation of the main gear 32, the lever 107 latches the toe 101a. Consequently the high point 101b of the cam 101 cannot come into engagement with the roller 100, and the roller 100 is brought into engagement with the relatively lower, adjacent cam edge 102a of the cam 102. Thus, the bracket 98 is turned counter-clockwise in response to the spring 99, the rod 96 is elevated, and the lower pick-up 94 is brought into engagement with the lower surface of the record to play the other side thereof.

During the playing of a record, whether it be the upper side or the lower side thereof, the cam 102 occupies the position shown in Fig. 11, with the pin 108 in engagement with the low portion 109b of the cam 109. When the main gear 32 begins to rotate, the cam 109 forces the lever 102 in a clockwise direction, as viewed in Fig. 11, until the cam portion 102b thereof, which is concentric with the pivot axis of the cam 102, rides against the roller 100. This maintains the pick-up arm 92 in a position such that both needles are out of engagement with the record and the arm 92 is free to be swung clear of the record. As the gear 32 continues to rotate, the high point 109a of the cam 109 causes the toe 101b of the cam 101 to be latched by the latch lever 107. If the machine is set to play only one side of each record, then the slide 51 engages the extension 110 to free the cam 101 and thereby cause the needle of the upper pick-up 93 to engage the upper groove of the record. However, if the machine is set to play both sides of each record, then, on every other rotation of the main gear 32, the cam 101 will remain latched, and the roller 100 will be forced against the low portion 102a of the cam 102 to bring the needle of the lower pick-up 94 into engagement with the groove on the lower surface of the record, all as above described.

Pivotally mounted on the bottom plate 25 is a tone arm return lever 115 which is constantly urged in a clockwise direction by a spring 116 to bring the extension 115a of the lever 115 into engagement with either a flat surface 12a on the adjacent pin 12 or against the more outwardly projecting portions of the circumference of this pin 12, as best seen in Figs. 3, 4 and 15. Whether the extension 115a engages the flat surface 12a or the more outwardly projecting portions of the pin determines whether the pick-up will be returned to the ten inch or to the twelve inch starting position. Adjustment of the head 9 as above described turns the last named pin 12 automatically into appropriate position for coaction with the lever end 115a. The lever 115 has secured thereto a bronze or other resilient feed-in leaf spring 117 which carries a block of damping material 118, such as DuPont "Viscaloid," or the like. The lever 115 also has pivotally mounted thereon a pawl 119 which is constantly urged counter-clockwise relative to the lever 115 by a spring 120.

Secured to the lower end of the tone arm bearing sleeve 89 is a collar 121 to which, in turn, is secured a trip lever 122 (see Figs. 15 and 20), the trip lever 122 pivotally carrying a trip pawl 123 and an upstanding actuating pin 124 (see Figs. 5 and 6). The pawl 123 is constantly urged in a clockwise direction relative to the trip lever 122 by a spring 125. The pin 124 is adapted to cooperate with the free end of the feed-in spring 117 in a manner shortly to be described, and is also adapted to be received in a notch 119a formed between a shoulder 119b on the pawl 119 and the adjacent edge of the tone arm return lever 115 (see Fig. 7).

The trip pawl 123 cooperates with a ratchet 126 carried by a ratchet lever 127 which is pivotally mounted on the bottom plate 25. The ratchet lever 127 has an arm 127a which carries a downwardly extending pin 128, the pin 128 passing through an opening 129 in the plate 25. A spring 130 biases the lever 127 counterclockwise to bring the pin 128 against the edge of the opening 129 and also against the toe 131a of a lever 131 (as shown in Fig. 5). The lever 131 is pivotally mounted on the bottom plate 25 and is provided with a second toe 131b and with an upwardly extending pin 132. A spring 133 constantly biases the lever 131 in a counterclockwise direction to insure engagement of its toe 131a with the pin 128.

During the time that a record is being played, the mercury switch lever 44 is in the position shown in Fig. 17, with its upper end in engagement with cam 45 on the under surface of the main gear 32, and the mercury switch 43 open. As one or the other of the pickups rides over the record, it carries with it the lever 122 and the trip pawl 123 rides over the teeth of the ratchet 126. When the needle reaches the eccentric terminal groove of conventional records, the backward movement of the pick-up arm 92 in response to the terminal groove produces a toggle action between the trip pawl 123 and the ratchet 126 in well-known manner. This forces the ratchet lever 127 clockwise, as seen in Figs. 5 and 6, and pulls the pin 128 away from the toe 131a. Consequently, the spring 133 becomes free to rotate the lever 131 counter-clockwise to bring the toe 131b into engagement with the upper end of the mercury switch lever 44 and force the latter into the position shown in Fig. 18, thereby closing the switch 43 to energize the cycle motor 39. The main gear 32 then begins its rotation.

Pivotally mounted on the bottom plate 25 is a tone arm lever 111 terminating in an inclined end 111a and provided with a slide arm 111b having an upstanding pin 112. The lever 111 also has a downwardly extending pin 113 which is held against the cam 34 by a spring 114. When the main gear 32 begins to rotate, the needle then in engagement with the record is freed from the record and the pick-up arm 92 is held in a neutral position by the arcuate portion 102b of the cam 102, as previously described. The cam 34 rotates the lever 111 clockwise, as seen in Figs. 3 and 4, to bring the lever end 111a into engagement with the pin 124 to thereby swing the pick-up arm assembly outwardly clear of the record. As this takes place, the pin 124 engages the pawl 119 and cams it clockwise until the pin 124 enters the notch 119a. In this position, the pin 124 compresses the damping member 118 and places the feed-in spring 117 under tension. Continued movement of the pin 124 rotates the tone arm return lever 115 counterclockwise until the high point of the cam 34 is in engagement with the pin 113. Thereafter, the cam 34 recedes and the spring 114 rotates the lever 111 counter-clockwise.

As the lever 111 rotates counter-clockwise, the tone arm return lever 115 follows it and is returned in a clockwise direction by the spring 116 until the extension 115a thereof engages either the outwardly projecting circumference of pin 12 or the flat 12a thereof, depending on whether 12" or 10" records are being played. The lever 111 continues to follow the cam 34 to the lowest point thereof, and, during this time, the pin 112 engages the pawl 119, rotating it clockwise to free the pin 124. At this point, either one of the cams 101 or 102, as the case may be, has already brought the appropriate needle into engagement with the ungrooved, marginal portion of the proper surface of the record to be played, and when the pin 124 is freed from the pawl 119, the spring 117 gently pushes the needle into the starting groove of the record. This gentle action results from the damping effect of the damping member 118, the latter being of such character that it has relatively high molecular inertia and therefore dissipates its energy relatively slowly. The record is then played and the cycle is repeated as above described.

The turntable 31 is driven by a reversible motor 135 of any suitable type through a reversing switch 136. The switch 136 has a toggle lever 136a (Figs. 11 to 13) which is normally biased in such a position as to cause the turntable motor to drive the turntable clockwise, when viewed from the top, as in Fig. 1. Driving torque is transmitted from the motor 135 through its motor shaft 137 and a pair of friction idlers 138, one of which is positioned to engage the driving wheel 30 when the turntable is raised to the elevated position. A spring 139 may be employed to insure engagement of the appropriate friction wheel 138 against the drive wheel 30 (see Fig. 19) when the turntable is in its elevated, or normal playing, position.

The cam 101 is provided with a toe 101c which is arranged to coact with the toggle 136a. Each time that the toe 101a of the cam 101 is brought into latching engagement with the latch lever 107, the toe 101c actuates the toggle 136a to reverse the motor 135. If the cam 101 remains latched because the slide bar 51 has not been advanced, the turntable motor 135 will continue to rotate in the reverse direction and the turntable will rotate counter-clockwise for the proper playing of the lower side of the record. However, whenever the latch lever 107 is actuated to free the cam 101, its toe 101c will be moved away from the toggle 136a, and the latter will be restored to its normal position to cause the turntable motor 135 to rotate in the original direction to drive the turntable in a clockwise direction.

To start the machine operating, it is merely necessary to place one or more records on the record supports 14 and one or the other of the ledges 16a or 16b, depending upon whether ten inch or twelve inch records are to be played. The main power switch 140 is then actuated to turn on the power. Normally, that is, when there are no records on the turntable, the pick-up arm 92 rests on a button 141 which controls an automatic start and stop switch 142 in series with the power switch 140 and also in series with the reversing switch 136, as seen in Fig. 23. A control button 143 which extends down through the top plate 1 is arranged to engage the horizontal arm of a bell crank 144 pivotally mounted on the top plate 1, the lower end of the bell crank 144 engaging a reject lever 145 which is pivoted preferably intermediate the ends thereof on the underside of the bottom plate 25, as shown most clearly in Figure 22. One end of the reject lever 145 is disposed adjacent the pin 128 but is normally retained out of engagement with that pin by a suitable spring. When the button 143 is depressed, the bell crank 144 actuates the lever 145 to move the pin 128 within the opening 129 in the same manner as when the trip pawl 123 actuates the ratchet lever 127. Consequently, the mercury switch 43 is closed in the manner heretofore described and the cycle motor 39 is energized. It is obvious that if it is desired to reject a record during playing, it is merely necessary to depress the button 143 to initiate a record changing cycle. After the last record of the stack has been played and discharged, when the pick-up arm 92 is returned to what would normally be the playing position on the top side of the record, the pick-up arm will continue to drop in the absence of a record on the turntable until it rests on the button 141 which controls the start and stop switch 142. In this way, the machine is automatically shut off.

If desired, a short circuiting switch 146 (Fig. 14) may be provided in any suitable location, as on the bottom plate 25, for example, for short circuiting the pick-ups 93 and 94 during the record changing cycle. For this purpose, the switch 146 may include a spring contact arm 146a which is normally maintained out of contacting relation with the switch arm 146b by a lever 147 pivoted on the bottom plate 25 and normally held in the position shown in Fig. 14 by the pin 108. As soon as the pin 108 moves out of the low portion 109b of the cam 109 and onto the high portion thereof, the lever 147 is forced by the spring action of blade 146a to follow the pin 108 and the short circuiting switch 146 becomes closed to short circuit the pick-ups. When the pin 108 is returned to its normal, or rest, position, it engages the lever 107, rotates it clockwise, as seen in Fig. 14, and brings it into engagement with the spring blade 146a to thereby again open the switch 146.

Although I have shown and described but one embodiment of my invention, it will be apparent to those skilled in the art that many changes therein, as well as other forms thereof, are possible. I therefore desire that the particular embodiment described herein and shown in the accompanying drawings may be taken as illustrative and not as limiting.

I claim as my invention:

1. In an automatic phonograph, the combination of means for supporting a stack of records, a tiltable turntable mounted to have a playing position underneath said stack, and record changing elements connected for effecting the transfer of records from said stack to said turntable one at a time in succession, said record changing elements including shelf structure positioned underneath said turntable playing position, release mechanism connected for causing said turntable to tilt from its playing position to a change position away from over the shelf structure, for then dropping one record from said stack directly onto said shelf structure, means for returning said turntable to said playing position and for causing it, during the return to pick up the record on the shelf structure.

2. The combination as defined by claim 1 in which the turntable has a width small enough not to obstruct a recording on the underside of a record held in playing position on it.

3. In an automatic phonograph, the combination of a platform having an opening therein, means for supporting a stack of records above said platform, a turntable movable through said opening and normally occupying a playing position above said platform in substantially axial alignment with said stack, means for withdrawing said turntable through said opening, means independent of said turntable for effecting release of successive lowermost records of said stack one at a time to free said records to drop successively onto said platform after said turntable has been withdrawn through said opening, and means for thereafter returning said turntable to its playing position, said turntable engaging and returning with it the released successive records during the return movement thereof.

4. In an automatic phonograph, the combination of a platform having an opening therein, means for supporting a stack of records above said platform, a turntable movable through said opening and normally occupying a playing position above said platform in substantially axial alignment with said stack, means for withdrawing said turntable through said opening, means independent of said turntable for effecting release of successive lowermost records of said stack one at a time to free said records to drop successively onto said platform after said turntable has been withdrawn through said opening, means for thereafter returning said turntable to its playing position, said turntable engaging and returning with it the released successive records during the return movement thereof, and means for effecting discharge from the turntable of the record thereon upon the next movement of said turntable through said opening.

5. In an automatic phonograph, the combination of a platform having an opening therein and a slot in communication with said opening, means for supporting a stack of records above said platform, a tiltably mounted turntable shaft normally extending through said slot, a turntable carried by said shaft and normally supported thereby in a playing position beneath said stack and over said platform, said shaft being tiltable through said slot to lower said turntable through said opening, and means engageable by a record on said turntable while said turntable is lowered through said opening to discharge said record from said turntable through said opening.

6. The invention set forth in claim 5 characterized in that last named means is constituted by a portion of said platform.

7. The invention set forth in claim 5 characterized in that said last named means is constituted by a portion of said platform interposed in the path of movement of said turntable carried record.

8. In an automatic phonograph, the combination of a platform having an opening therein and a slot communicating with said opening, means for supporting a stack of records above said platform, a tiltably mounted turntable shaft normally extending through said slot, a turntable carried by said shaft and normally supported thereby in a playing position between said stack and said platform in substantially axial alignment with said stack, said shaft being tiltable through said slot to lower said turntable through said opening, means for effecting release of successive lowermost records of said stack one at a time to free said records to drop successively onto said platform after said turntable has been lowered through said opening, and means for returning said turntable to its playing position after each successive record has dropped onto said platform, said turntable picking up the newly dropped record and returning with it to its playing position.

9. The invention set forth in claim 8 characterized by the addition of means for centering each record with respect to said turntable as said turntable returns to its playing position.

10. The invention set forth in claim 8 characterized by the addition of means for discharging from the turntable the record supported thereby while said turntable is being lowered through said opening and prior to release of the next succeeding record of the stack.

11. The invention set forth in claim 8 characterized in that said turntable engages only the ungrooved portion of one side of each record, and characterized by the addition of means for playing both sides of each record prior to the tilting of said shaft to effect discharge of the record from the turntable.

12. The invention set forth in claim 8 characterized by the addition of means for rotating said turntable alternately first in one direction and then in the opposite direction prior to each tilting of said shaft to withdraw said turntable through said opening.

13. The invention set forth in claim 8 characterized by the addition of a reversible motor for rotating said turntable first in one direction and then in the opposite direction prior to each tilting of said shaft to withdraw said turntable through said opening, and characterized further by the addition of a second motor for effecting tilting of said shaft.

14. The invention set forth in claim 8 characterized in that said turntable engages only the central ungrooved portion of each record whereby to leave the grooved portions on each side thereof exposed, characterized further by the addition of means for rotating said turntable alternately first in one direction and then in the opposite direction prior to each tilting of said shaft to withdraw said turntable through said opening, and characterized still further by the addition of a pair of signal translating devices one of which cooperates with the groove on one side of the turntable supported record while the turntable is rotating in said first mentioned direction, and the other of which cooperates with the groove on the other side of said record while the turntable is rotating in said opposite direction.

15. In a phonograph, the combination of a rotatable turntable shaft, a turntable carried by said shaft for holding record discs, said turntable having a width small enough not to obstruct a recording on the underside of a record disc held by it, drive elements also carried by said shaft, means mounting said shaft for tilting movement, a reversibly driving impelling mechanism including a driving pulley, means normally maintaining said shaft in a record reproducing position such that said drive wheel is in engagement with said pulley to provide a driving coupling between said impelling mechanism and said turntable for reproducing the recording on either side of the record, record changing means for periodically tilting said shaft to cause a record disc on the turntable to be removed and to disengage said drive elements from said pulley to thereby break said coupling and for subsequently restoring said shaft to its said initial position to cause the turntable to receive another record disc and to re-establish said coupling, and means for automatically reversing the drive impelling direction of said impelling mechanism prior to return of said shaft to said record reproducing position.

16. In an automatic phonograph, the combination of a turntable, and means for supporting a stack of records above said turntable for successive transference thereto one at a time, said means comprising a plurality of supporting posts disposed circumferentially about said turntable, one of said posts being mounted for rotation on its own axis only and at least one other of said posts being mounted for rotation on its own axis and also for movement bodily about a second axis parallel to its own axis, said first mentioned post having a head thereon which extends in diametrically opposite directions and terminates at each end thereof in a downwardly extending ledge each at a different radial distance from the axis of said first mentioned post, said second mentioned post including a record supporting shelf and being movable bodily about said parallel axis into different radial positions relative to the axis of said turntable, and means coupling said posts for rotation of said first named post on its axis and for movement of said second named post about said parallel axis in unison whereby to adjust said posts relative to said turntable to accommodate records of different diameters, and said shelf and either of said ledges serving to support the lowermost record of the stack.

17. In an automatic phonograph which includes record transfer means for effecting the transfer of a plurality of records singly in succession from a stack to a turntable for playing, a pivoted tone arm and a pickup at the free end thereof for movement of said pickup across said turntable in engagement with a record, said means including a last record stop member movable by said tone arm following the playing of a last record, an electric control circuit including a last record stop switch connected for operation by said last record stop member upon movement of said last record stop member by said tone arm to open said switch and stop record playing operations, cycling mechanism operatively connected with said tone arm and said record transfer means including a cycling switch and record rejecting means operable for closing said cycling switch upon the completion of the playing of a record to effect transference of a record from said stack to said turntable, and said cycling mechanism being also connected for automatically returning the last record stop switch from the open condition to the closed condition to effect record playing operations.

18. The combination as defined by claim 17 in which the cycling mechanism includes an independently energizable electric motor, and the record rejecting means is connected for directly energizing said motor.

19. The combination as defined by claim 17 in which a first electric motor is connected for control by the last-record-stop switch to rotate the turntable, and a second electric motor is connected for control by the cycling switch to energize the record transfer cycle regardless of the condition of the last-record-stop switch.

20. The combination as defined by claim 17 in which the cycling mechanism is connected to hold the cycling switch in closed condition for the duration of a record changing cycle, regardless of how this switch is shifted to this condition.

21. The combination as defined in claim 19 characterized in that said first electric motor is a reversible motor, and characterized further by the addition of a reversing switch in series with the last-record-stop switch to control the direction of rotation of said reversible motor, for effecting the reproduction of the recordings on opposite faces of the individual records without turning the records over.

22. In a phonograph having a turn table rotating about a spindle and an arm carrying a needle engageable with a record disc on said turn table, said record disc having an opening through which said spindle passes; a record changer comprising a pair of supporting members spaced around said turn table, said supporting members including platforms extending in a plane substantially above said turn table and spaced to support a stack of records at the edges of the lowest record in the stack; one of said platforms being operable to non-supporting position to release an edge of the lowest record in the stack, and means carried by said platform engageable with the edge of the next record to support the same when said platform is operated to non-supporting position; and means for varying the spacing between said platforms to accommodate records of different sizes; said means including a slidable mount for the support of one of said platforms and a rotatable mount for the other of said platforms; said other platform having a plurality of boundaries at different distances from said rotatable mount and extending from its support toward said turn table for different distances at different angular positions thereof; a connecting member between the mounts of said platforms; a shift handle mounted on said other platform; rotation of said shift handle causing longitudinal movement of said connecting member and varying the spacing of said platforms.

23. In a phonograph having a turn table rotating about a spindle and an arm carrying a needle engageable with a record disc on said turn table, said record disc having an opening through which said spindle passes; a record changer comprising a pair of supporting members spaced around said turn table, said supporting members including platforms extending in a plane substantially above said turn table and spaced to support a stack of records at the edges of the lowest record in the stack; and means for varying the spacing between said platforms to accommodate records of different sizes; said means including a slidable mount for the support of one of said platforms and a rotatable mount for the other of said platforms; said other platform having a plurality of boundaries at different distances from said rotatable mount and extending from its support toward said turn table for different distances at different angular positions thereof; and members interconnecting the rotatable mount for said other platform with the slidable mount for the first platform whereby movement of a platform to vary its setting for a specific record size will move the other platform to a corresponding setting.

24. In a phonograph having a turn table rotating about a spindle and an arm carrying a needle engageable with a record disc on said turn table; said record disc having an opening through which said spindle passes; a record changer comprising a pair of supporting members spaced around said turn table, said supporting members including platforms extending in a plane substantially above said turn table and spaced to support a stack of records at the edges of the lowest record in the stack, record changer operating mechanism connected to one of said supporting members, one of said platforms being movable by said operating mechanism to non-supporting position to release an edge of the lowest record in the stack, and means carried by said platform engageable with the edge of the next record to support the same when said platform is operated to non-supporting position; and means for varying the spacing between platforms to accommodate records of different sizes; said means including a slidable mount for one of said platforms; and a rotatable mount for the other of said platforms; said other platform having a plurality of boundaries at different distances from said rotatable mount and extending from its support toward said turn table for different distances at different angular positions thereof.

25. In a phonograph having a turn table rotating about a spindle and an arm carrying a needle engageable with a record disc on said turn table, said record disc having an opening through which said spindle passes; a record changer comprising a pair of supporting members spaced around said turn table, said supporting members including platforms extending in a plane substantially above said turn table and spaced to support a stack of records at the edges of the lowest record in the stack; record changer operating mechanism connected to one of said supporting members, one of said platforms being movable by said operating mechanism to non-supporting position to release an edge of the lowest record in the stack, and means carried by said platform engageable with the edge of the next record to support the same when said platform is operated to non-supporting position; and means for varying the spacing between said platforms to accommodate records of different sizes; said means including a slidable mount for one of said platforms, and a rotatable mount for the other of said platforms; said other platform having a plurality of boundaries at different distances from said rotatable mount and extending from its support toward said turn table for different distances at different angular positions thereof; an arm extending from said rotatable mount of said other platform, and a link interconnecting said arm and operating mechanism of said first platform, whereby rotation of said rotatable support of said other platform will cause a movement of the operating mechanism and sliding of the platform connected thereto.

BENJAMIN R. CARSON.

REFERENCES CITED

The following references are of record in the file of this patent:

UNITED STATES PATENTS

| Number | Name | Date |
|---|---|---|
| 839,902 | Spurgeon | Jan. 1, 1907 |
| 1,302,217 | Raney | Apr. 29, 1919 |
| 1,727,731 | Reade et al. | Sept. 10, 1929 |
| 1,838,101 | Mallina | Dec. 29, 1931 |
| 1,910,685 | Fisken | May 23, 1933 |
| 1,911,707 | Mills | May 30, 1933 |
| 1,958,801 | Saal | May 15, 1934 |
| 2,159,836 | Alm | May 23, 1939 |
| 2,188,769 | Downs | Jan. 30, 1940 |
| 2,270,415 | Catucci | Jan. 20, 1942 |
| 2,297,014 | Offen | Sept. 29, 1942 |
| 2,307,030 | Erwood | Jan. 5, 1943 |
| 2,328,052 | Butler | Aug. 31, 1943 |
| 2,352,331 | Leline | June 27, 1944 |
| 2,396,094 | Gay | Mar. 5, 1946 |

FOREIGN PATENTS

| Number | Country | Date |
|---|---|---|
| 393,364 | Germany | Apr. 1, 1924 |
| 32,652 | France | Feb. 15, 1928 |
| 338,508 | Great Britain | Nov. 12, 1930 |
| 406,354 | Great Britain | Feb. 26, 1934 |
| 598,584 | Germany | Oct. 12, 1934 |
| 498,442 | Great Britan | Jan. 9, 1939 |
| 533,976 | Germany | Sept. 3, 1931 |